R. MORRISON.
Improvement in Photographic-Lens.
No. 126,979. Patented May 21, 1872.
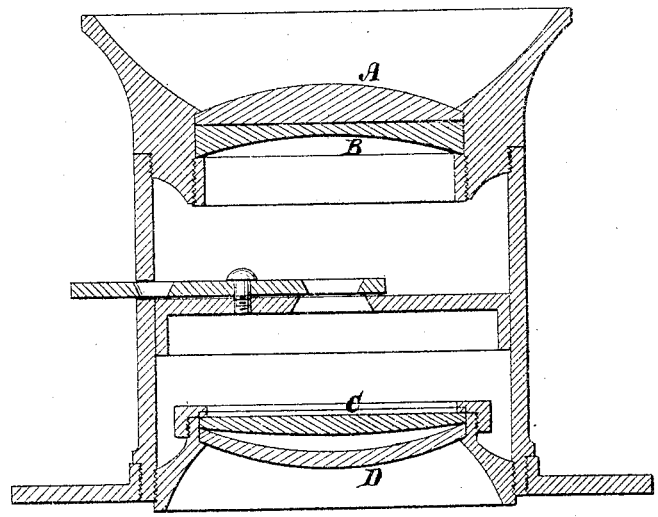
Witnesses:
A Bennerendorf
Alex F. Roberts
Inventor:
R. Morrison.
PER
Attorneys.

126,979

UNITED STATES PATENT OFFICE.

RICHARD MORRISON, OF BROOKLYN, E. D., ASSIGNOR TO SCOVILL MANUFACTURING COMPANY, OF NEW YORK, N. Y.

IMPROVEMENT IN PHOTOGRAPHIC LENSES.

Specification forming part of Letters Patent No. 126,979, dated May 21, 1872.

Specification describing a new and Improved Landscape-Lens, invented by RICHARD MORRISON, of Brooklyn, in the county of Kings and State of New York.

In my improved lens, which is designed for a wide-angle view-lens, the front is composed of a plano-convex lens of plate-glass, cemented to another plano-concave lens of flint-glass, of such curves that will produce a combined lens sufficiently over-corrected for actinic rays to properly correct the back combination, which is chromatic, and is composed of two lenses of plate-glass, the first, or interior one, being a plano-convex, or double convex of the same focus as the second or exterior, which is a meniscus of nearly the same radiuses as the front combination.

The drawing is a sectional elevation of my improved view-lens.

A is the plano-convex lens, and B the plano-concave lens of the front combination. C is the interior plano-convex lens, and D the exterior meniscus lens of the back combination, having a space between them at their axis. Instead of a plano-convex lens C, I may use a double-convex lens in place of it. The focus from back lens is 4 inches; diameter of lenses, 1 inch; distance from front to back lens, 1 inch. These dimensions may be varied, according to the will of the constructor. The radius of the front lens A is 1.2 inch; the radius of lens B is 1.650 inch; combined focuses, 7 inches; radius of lens C is $+12$ inches; the radius of lens D, $-2$ inches and $+1.70$ inch; focus of lens C, 24 inches; meniscus, 22 inches; combined focuses, 11 inches. These will be varied as the focus of the front combination is varied.

The combining the meniscus lens D with lens C permits the use of lenses of shorter focuses with less spherical aberration than can be used with either a meniscus or convex lens separately. It also permits the use of larger openings in the diaphragm, thereby working in less time, with a wider angle.

Having thus described my invention, I claim as new and desire to secure by Letters Patent—

In a wide-angle view-lens, a meniscus lens placed behind a convex lens, so as to inclose an air meniscus between them, substantially as specified.

The above specification of my invention signed by me this 28th day of February, 1872.

RICHARD MORRISON.

Witnesses:
GEO. W. MABEE,
T. B. MOSHER.